(12) United States Patent
Sakamoto

(10) Patent No.: US 7,712,573 B2
(45) Date of Patent: May 11, 2010

(54) WORKING VEHICLE

(75) Inventor: Kunihiko Sakamoto, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 183 days.

(21) Appl. No.: 11/574,224

(22) PCT Filed: Sep. 14, 2004

(86) PCT No.: PCT/JP2004/013340

§ 371 (c)(1),
(2), (4) Date: Jul. 10, 2007

(87) PCT Pub. No.: WO2006/022029

PCT Pub. Date: Mar. 2, 2006

(65) Prior Publication Data

US 2007/0267244 A1    Nov. 22, 2007

(30) Foreign Application Priority Data

Aug. 24, 2004  (JP)  ............................. 2004-244293

(51) Int. Cl.
*B60K 17/00* (2006.01)
(52) U.S. Cl. .................. 180/374; 180/365; 180/367; 180/375; 180/376; 180/292; 180/53.4; 180/307; 180/242
(58) Field of Classification Search ................ 180/337, 180/350, 357, 360, 374, 376, 305, 306, 307, 180/291, 292, 53.1, 53.4, 377–379, 375, 180/364–367, 233, 344, 242
See application file for complete search history.

(56) References Cited

U.S. PATENT DOCUMENTS

| | | | | |
|---|---|---|---|---|
| 4,627,237 | A | * | 12/1986 | Hutson ......................... 60/487 |
| 4,756,208 | A | * | 7/1988 | Hayashi et al. ............... 56/14.7 |
| 6,578,656 | B2 | * | 6/2003 | Samejima et al. ........... 180/291 |

(Continued)

FOREIGN PATENT DOCUMENTS

| | | |
|---|---|---|
| GB | 924 185 | 4/1963 |
| JP | 53 120047 | 10/1978 |
| JP | 61-109965 | 5/1986 |
| JP | 4-231767 | 8/1992 |
| JP | 08-104149 | 4/1996 |

(Continued)

OTHER PUBLICATIONS

Masahide Osujo, Hydromechanical Variable-Speed Transmission System, Oct. 20, 1978, Japan Patent Office, Translation of JP 53120047A, Entire Document.*

(Continued)

*Primary Examiner*—Paul N Dickson
*Assistant Examiner*—James English
(74) *Attorney, Agent, or Firm*—Sterne, Kessler, Goldstein & Fox P.L.L.C

(57) ABSTRACT

An object of the invention is to change a layout structure of a hydraulic continuously variable transmission apparatus (HST) particularly constituting a hydromechanical continuously variable transmission apparatus (HMT) as a continuously variable transmission apparatus, thereby achieving a simplification of structures of a working vehicle and a traveling drive system, and an easiness of a maintenance. In a working vehicle provided with an HMT structured such as to combine an HST and a planetary gear mechanism as the traveling drive system so as to output and rotate a power of an engine while shifting gear, the HST is provided with a hydraulic pump and a hydraulic motor integrally in a front wall of a transmission case, and is arranged in an upper side of a transmission shaft transmitting the power to the transmission case from the engine.

10 Claims, 5 Drawing Sheets

U.S. PATENT DOCUMENTS

| | | |
|---|---|---|
| 6,616,559 B1 * | 9/2003 | Hori et al. ............... 475/23 |
| 6,860,358 B1 * | 3/2005 | Hauser et al. ............ 180/305 |
| 6,988,571 B2 * | 1/2006 | Okamoto et al. ......... 180/6.48 |
| 2003/0162618 A1 * | 8/2003 | Hasegawa et al. ......... 475/72 |
| 2003/0226357 A1 * | 12/2003 | Nakatani ................ 60/487 |
| 2004/0149506 A1 * | 8/2004 | Sakikawa et al. ......... 180/242 |

FOREIGN PATENT DOCUMENTS

| | | |
|---|---|---|
| JP | 2000-18367 | 1/2000 |
| JP | 2002-2319 | 1/2002 |
| JP | 2002-139126 | 5/2002 |
| SU | 945 533 B | 7/1982 |
| SU | 1 516 692 | 10/1989 |
| SU | 1394 844 | 9/1992 |

OTHER PUBLICATIONS

International Search Report mailed on Nov. 12, 2004 for International Application No. PCT/JP2004/13340 filed on Sep. 14, 2004.
Supplemental European Search Report for corresponding application No. EP04773022, European Patent Office, completed Aug. 22, 2008, 2 pgs.

* cited by examiner

WORKING VEHICLE

BACKGROUND OF THE INVENTION

1. Field of Invention

The present invention relates to a working vehicle, and more particularly to a layout structure of a hydraulic continuously variable transmission apparatus with respect to a transmission case, in a hydromechanical continuously variable transmission apparatus of the working vehicle.

2. Background Art

Conventionally, a working vehicle such as a tractor, a carrier vehicle or the like is structured such that rear wheels are driven by arranging an engine in a front portion of a vehicle body and arranging a transmission case in a rear portion, and is provided with a transmission constituted by a transmission mechanism, a clutch mechanism and the like for inputting a power of the engine and transmitting the power to an axle after changing gear. In a transmission structure of the working vehicle, there are proposed a lot of structures provided with a main transmission mechanism using a hydrostatic continuously variable transmission apparatus (a hydrostatic transmission, hereinafter refer to "HST" for short). Further, particularly in recent years, there is widely produced a hydromechanical continuously variable transmission apparatus (a hydromechanical transmission, hereinafter refer to "HMT" for short) structured by combining the HST and a differential mechanism, because it has excellent operability at a time of shifting gears in comparison with the mechanical transmission mechanism and has excellent energy efficiency in comparison with the HST.

In this case, as a layout of a traveling drive system of the working vehicle employing the HST mentioned above, there is proposed a structure in which a hydraulic pump and a hydraulic motor constituting the HST are separately arranged, and are hydraulically connected, and an engine power is output to the hydraulic motor, however, the structure is generally made such that the engine power is transmitted to the transmission (HST) via a transmission shaft corresponding to an output shaft of the engine.

Specifically, there are proposed a monocoque body structure in which a transmission case is directly connected to an engine so as to double as a machine body frame, and a structure in which an engine and a transmission case are separately arranged and an output shaft of the engine is inserted into the transmission case. For example, patent document 1 discloses a working vehicle provided with an input split type HMT, and patent document 2 discloses a working vehicle provided with an output split type HMT, in each of which a monocoque body structure is formed by directly connecting an engine and a transmission case (refer to patent document 1 and patent document 2). Further, patent document 3 discloses a working vehicle in which an HST is attached to an outer side of a transmission case, and an output shaft from an engine is inserted as an input shaft of the HST to the HST (refer to patent document 3).

Patent Document 1: Japanese Unexamined Patent Publication No. 2000-18367

Patent Document 2: Japanese Unexamined Patent Publication No. 2002-139126

Patent Document 3: Japanese Unexamined Patent Publication No. 1996-104149

However, in the conventional layout of the traveling drive system of the working vehicle, the following problems are generated.

As disclosed in the patent document 1 and the patent document 2, in the structure in which the HST is inward provided in the transmission case so as to be arranged as a part of the machine body frame, there is a case that a working fluid supplied to and discharged from the HST (the hydraulic pump and the hydraulic motor) and a working fluid supplied to and discharged from the other elements such as the clutch and the like are mixed within the transmission case. Particularly in the HMT, since the differential mechanism is attached simultaneously with the HST at a time of assembling the transmission, a dust is generated, and there is a case that the dust gets into the transmission case. Accordingly, a foreign material such as the dust or the like is mixed into the hydraulic pump and the hydraulic motor of the HST, and a malfunction tends to be generated in a cylinder, a piston or the like of the hydraulic pump and the hydraulic motor.

Further, as disclosed in the patent document 1 to the patent document 3 mentioned above, in the structure in which the output shaft of the engine serving as the transmission shaft passes through the HST (the hydraulic pump and the hydraulic motor) in a longitudinal direction, the output shaft mentioned above forms an obstacle. It is hard to attach and detach the HST to and from the transmission, and it is troublesome to assemble and disassemble the transmission for maintenance.

The problem to be solved by the invention exists in changing a layout structure of an HST (a hydraulic pump and a hydraulic motor) constituting a continuously variable transmission apparatus in a working vehicle so as to achieve a simplification of the structures of the working vehicle and a transmission, thereby increasing the ease of a maintenance.

BRIEF SUMMARY OF THE INVENTION

The problem to be solved by the present invention is as mentioned above, and a description will be given next of a means for solving the problem.

There is provided a working vehicle provided with a continuously variable transmission apparatus structured such as to combine a hydraulic continuous variable transmission apparatus and a gear as a traveling drive system so as to output and rotate a power of an engine while shifting gears, wherein the continuously variable transmission apparatus is provided with a hydraulic pump and a hydraulic motor integrally in a front wall of a transmission case, and is arranged in an upper side of a transmission shaft transmitting the power to the transmission case from the engine.

Further, in the working vehicle in accordance with the present invention, the continuously variable transmission apparatus is provided at a position facing a working machine pump attached to a rear wall of the engine.

Further, in the working vehicle in accordance with the present invention, the continuously variable transmission apparatus, a working machine pump and a working fluid tank are arranged in a space below a floor plate.

Further, in the working vehicle in accordance with the present invention, a hydraulic operation device is arranged in an upper side of the continuously variable transmission apparatus.

As an effect of the present invention, the following effects can be achieved.

In the working vehicle in accordance with the present invention, since the continuously variable transmission apparatus is provided with the hydraulic pump and the hydraulic motor integrally in the front wall of the transmission case, and is arranged in the upper side of the transmission shaft transmitting the power to the transmission case from the engine, in the working vehicle provided with the continuously variable transmission apparatus structured such as to combine the hydraulic continuous variable transmission apparatus and the gear as the traveling drive system so as to output and rotate a power of an engine while shifting gear, the transmission case and the continuously variable transmission apparatus are separately structured. Accordingly, it is possible to prevent the dust from being mixed into the continuously variable transmission apparatus, and it is easy to attach and detach the continuously variable transmission apparatus, whereby it is possible to improve a maintenance performance of the working vehicle, the traveling drive system and the like. Further, it is possible to attach and detach the continuously variable transmission apparatus from the working vehicle without being obstructed by the transmission shaft of the engine, and it is possible to improve the maintenance performance thereof.

Further, since the continuously variable transmission apparatus is provided at the position facing the working machine pump attached to the rear wall of the engine, the hydraulic devices of the working vehicle such as the continuously variable transmission apparatus, the working machine pump and the like are provided in the vicinity. It is possible to concentrically and easily maintain these elements all at once, and it is possible to simplify the structure of the traveling drive system.

Further, since the continuously variable transmission apparatus, the working machine pump and the working fluid tank are arranged in the space below the floor plate, it is possible to compactly arrange the hydraulic devices by effectively utilizing the space below the floor plate, it is possible to overlook the hydraulic devices such as the continuously variable transmission apparatus, the working pump, the working fluid tank and the like all at once only by detaching the floor plate, and it is possible to easily execute the maintenance or the like from the above.

Further, since the hydraulic operation device is arranged in the upper side of the continuously variable transmission apparatus, it is possible to arrange the hydraulic operation device and the continuously variable transmission apparatus in the vicinity, it is possible to make a hydraulic piping short, it is possible to make a loss small, and it is possible to easily assemble.

DETAILED DESCRIPTION OF THE INVENTION

Next, a description will be given below of an embodiment of the present invention with reference to the accompanying drawings. In this case, a description will be given of a back hoe loader as a working vehicle in accordance with the present embodiment, however, the present invention can be applied to all around the working vehicles such as a tractor, a rice planting machine, a carrier vehicle and the like.

Figure 1:
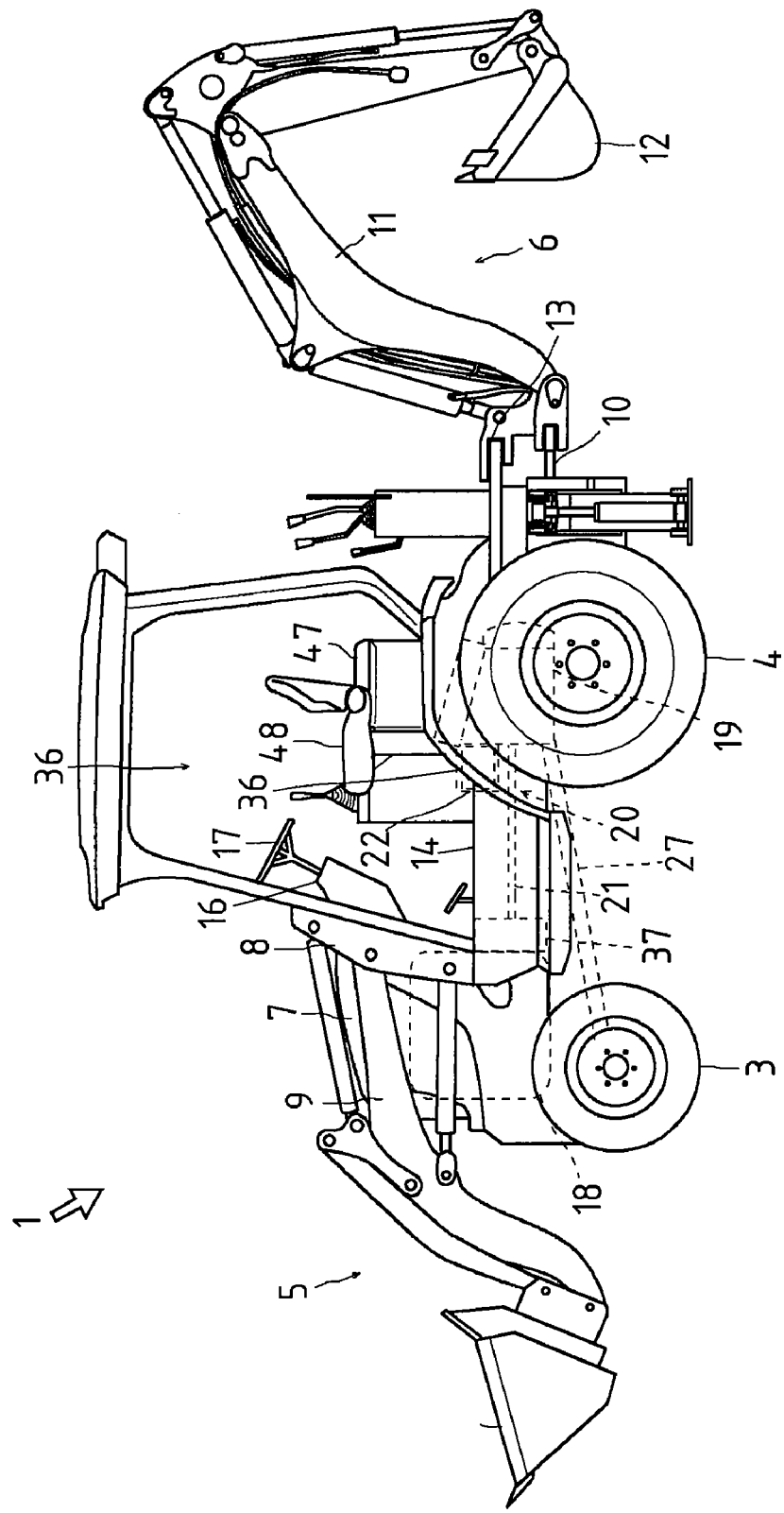
FIG. 1 is a side elevational view showing a whole structure of a working vehicle in accordance with an embodiment of the present invention.
Figure 2:
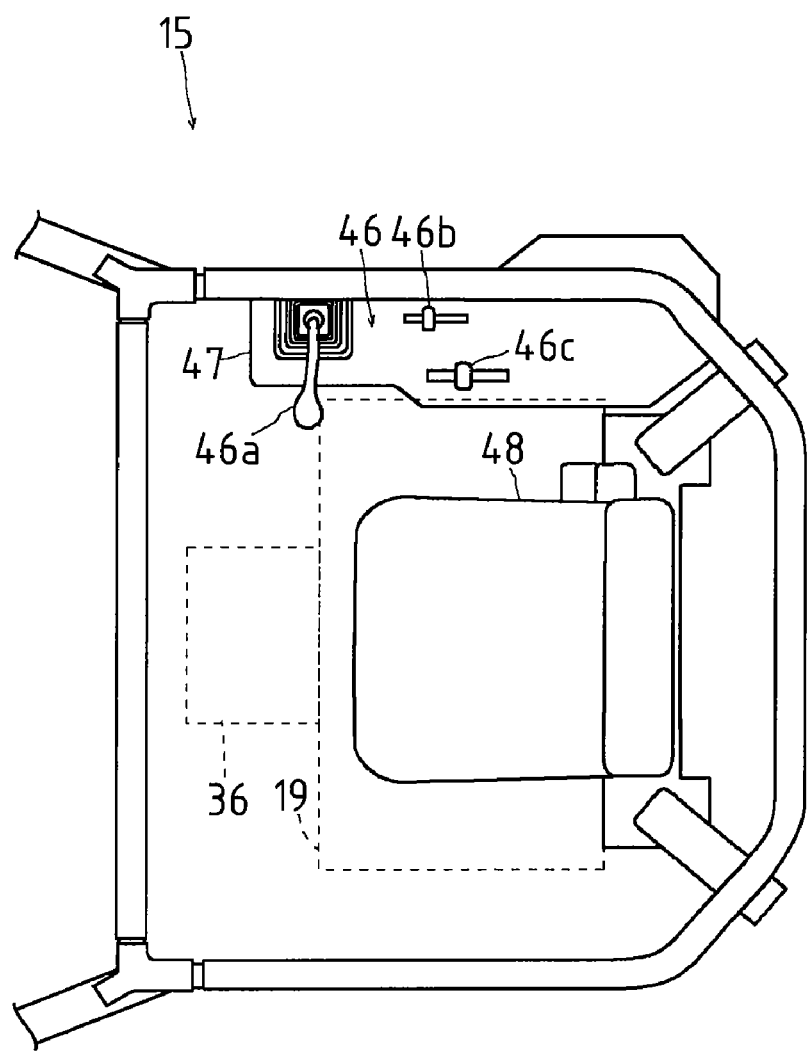
FIG. 2 is a plan view of a control portion.
Figure 3:
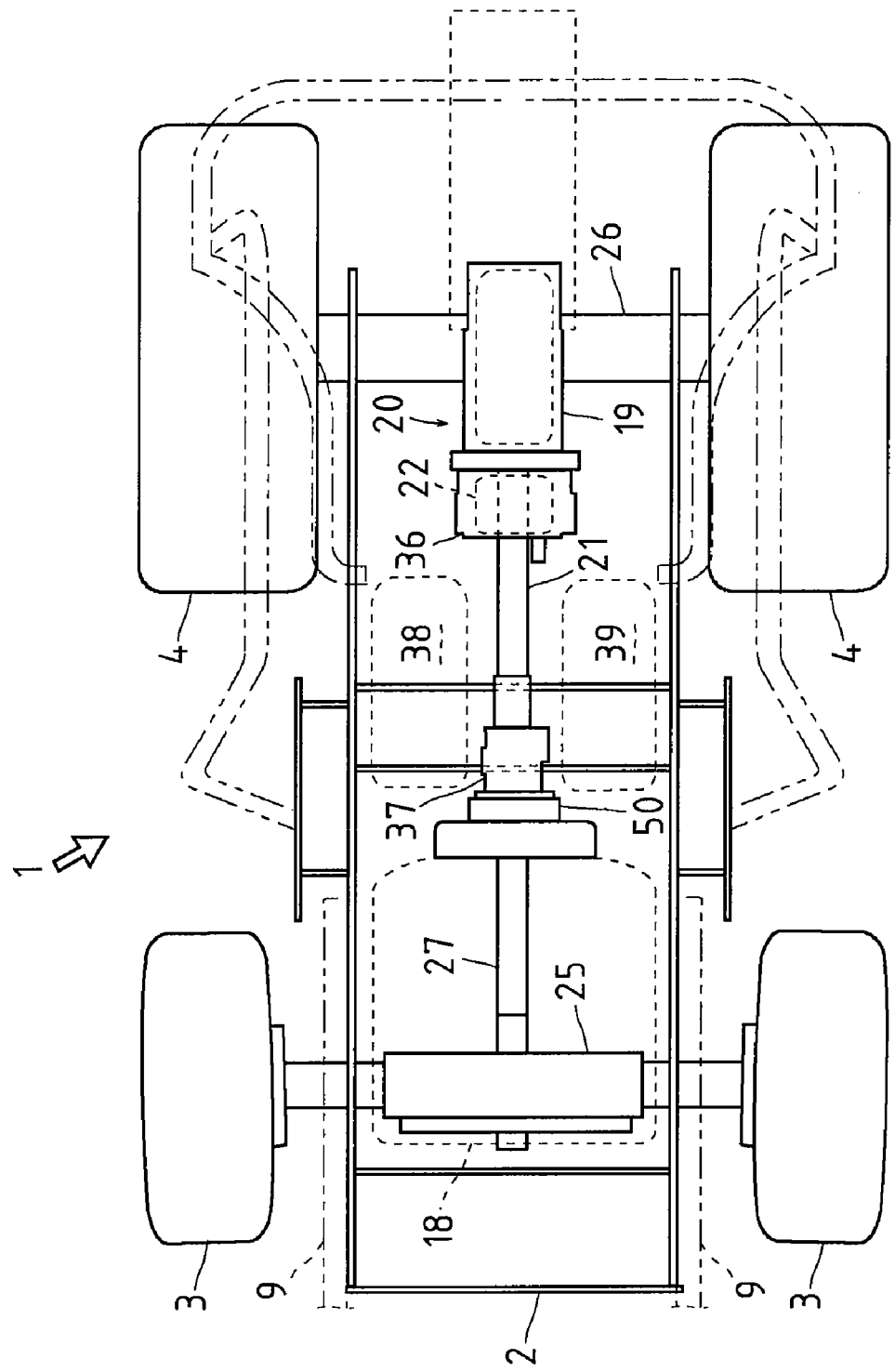
FIG. 3 is a plan schematic view of FIG. 1.

First, a description will be given of an outline of a whole structure of a working vehicle 1 in accordance with the present embodiment. As shown in FIGS. 1 to 3, a working vehicle 1 in accordance with the present embodiment is structured such that a machine body frame 2 is arranged from a front end portion of a vehicle main body to a rear end portion, and front wheels 3 and rear wheels 4 are respectively attached to a front portion and a rear portion of the machine body frame 2 via a front axle case 25 and a rear axle case 26. The working vehicle 1 is constituted by a back hoe loader, and a loader 5 and an excavation apparatus 6 serving as a loading apparatus are installed thereto. The loader 5 is constituted by a bracket 8, a lift arm 9 and the like, and is used as a front loader. A hood 7 covering an engine 18 or the like is provided in a front portion of the working vehicle 1, the bracket 8 is arranged in both right and left side portions of the hood 7, and the bracket 8 is fixed to the machine body frame 2 of the working vehicle 1. The lift arm 9 is attached to the bracket 8. The lift arm 9 is formed such that front and rear center portions are bent to an upper side from a straight line obtained by connecting both ends, and is structured as an approximately obtuse shape, thereby it is capable of steering and turning the front wheels 3 in a lower side of the lift arm 9. A bucket is arranged in a front end of the lift arm 9 such as to be rotatable up and down.

The excavation apparatus 6 is constituted by a boom bracket 10, a boom 11, a bucket 12 and the like. A mounting portion 13 of the boom bracket 10 is provided in a protruding manner in a rear portion of the machine body frame 2, and the boom bracket 10 is pivoted to the mounting portion 13 so as to be rotatable right and left. A base portion of the boom 11 is pivoted to the boom bracket 10 so as to be rotatable backward and forward, and the bucket 12 serving as an attachment for working is pivoted to a leading end portion of the boom 11 so as to be rotatable backward and forward.

A floor plate (a step) 14 is mounted to a rear side of the hood 7 in the front and rear center portions of the machine body frame 2, and a driver seat 48 is rotatably arranged in a rear upper side of the floor plate 14. A front side of the driver seat 48 is provided with a dash board 16 and a steering wheel 17 for a steering operation, and these control portions 15 are covered by a canopy. In this control portion 15, a hydraulic operation device 46 constituted by a working lever 46a for a loader work, an accelerator lever 46b, a sub transmission lever 46c and the like, and a display apparatus such as a meter and the like are concentrically arranged as an operation portion 47 in a side portion of the driver seat 48 in the control portion 15. A control valve or the like is arranged in a lower side of the hydraulic operation device 46. A working fluid is supplied to a cylinder, an actuator or the like on the basis of an operation of the hydraulic operation device 46. In other words, in an HST housing 36 having an HST 22 built-in, the transmission 20 and the like are arranged in the lower side of the floor plate 14. In accordance with this structure, it is possible to arrange the hydraulic operation device 46, the control valve and the HST 22 in the vicinity, it is possible to make a hydraulic piping short, it is possible to make a loss small, and it is possible to easily assemble. Further, this hydraulic operation device 46 is arranged at upper side of the HST 22.

The engine 18 is mounted on the front portion of the machine body frame 2, and is covered by the hood 7. A transmission 20 is structured in the transmission case 19 so as to form a traveling drive system in the rear portion of the machine body frame 2 in the rear side of the engine 18. The engine 18 is supported to the front portion of the machine body frame 2 extending approximately horizontally in a longitudinal direction, an output shaft of the engine 18 is protruded to a rear side, and is coupled in an interlocking manner to the transmission 20 via a clutch and a transmission shaft 21, and the power of the engine 18 is transmitted to the transmission 20 via the transmission shaft 21.

Figure 4:
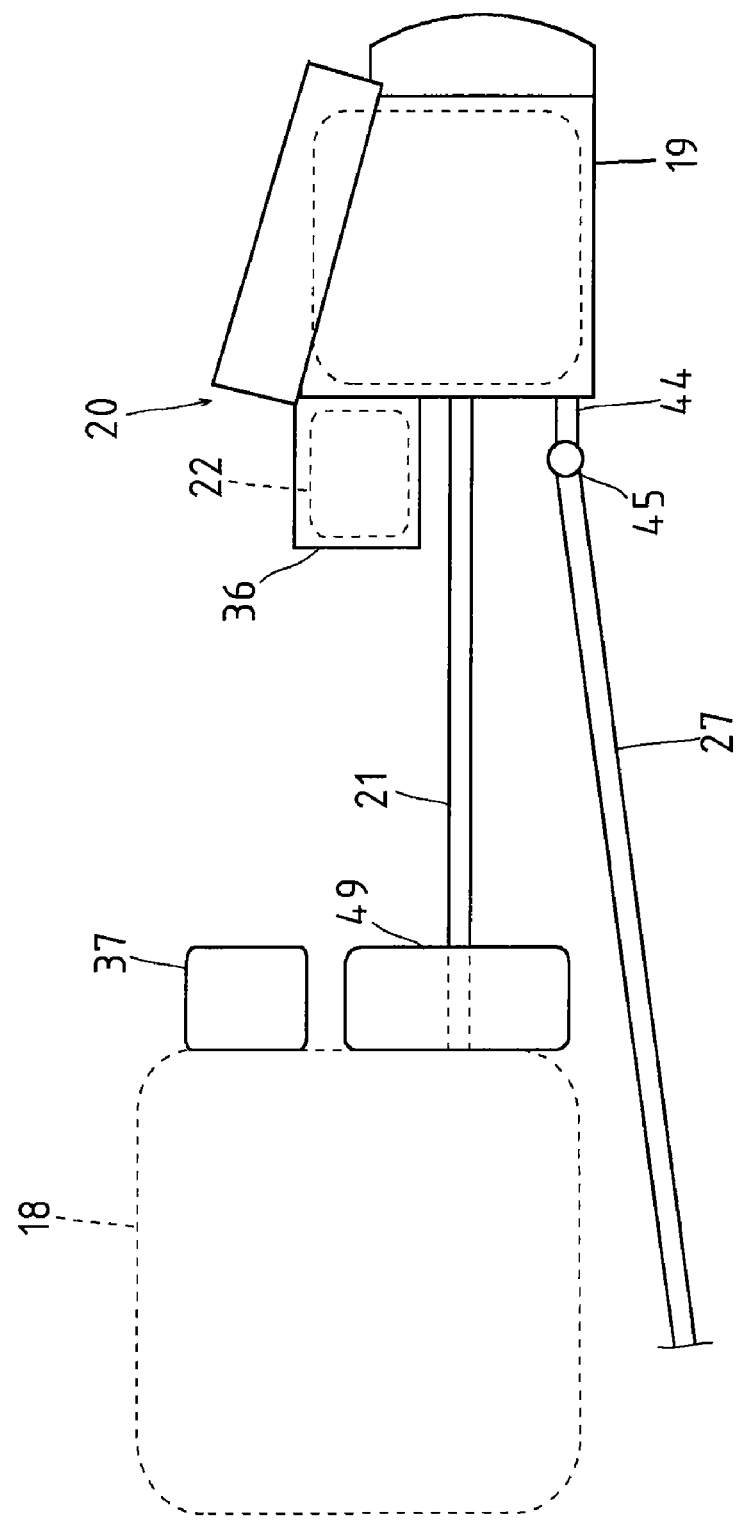
FIG. 4 is a side elevational schematic view of a traveling drive system of the working vehicle.
Figure 5:
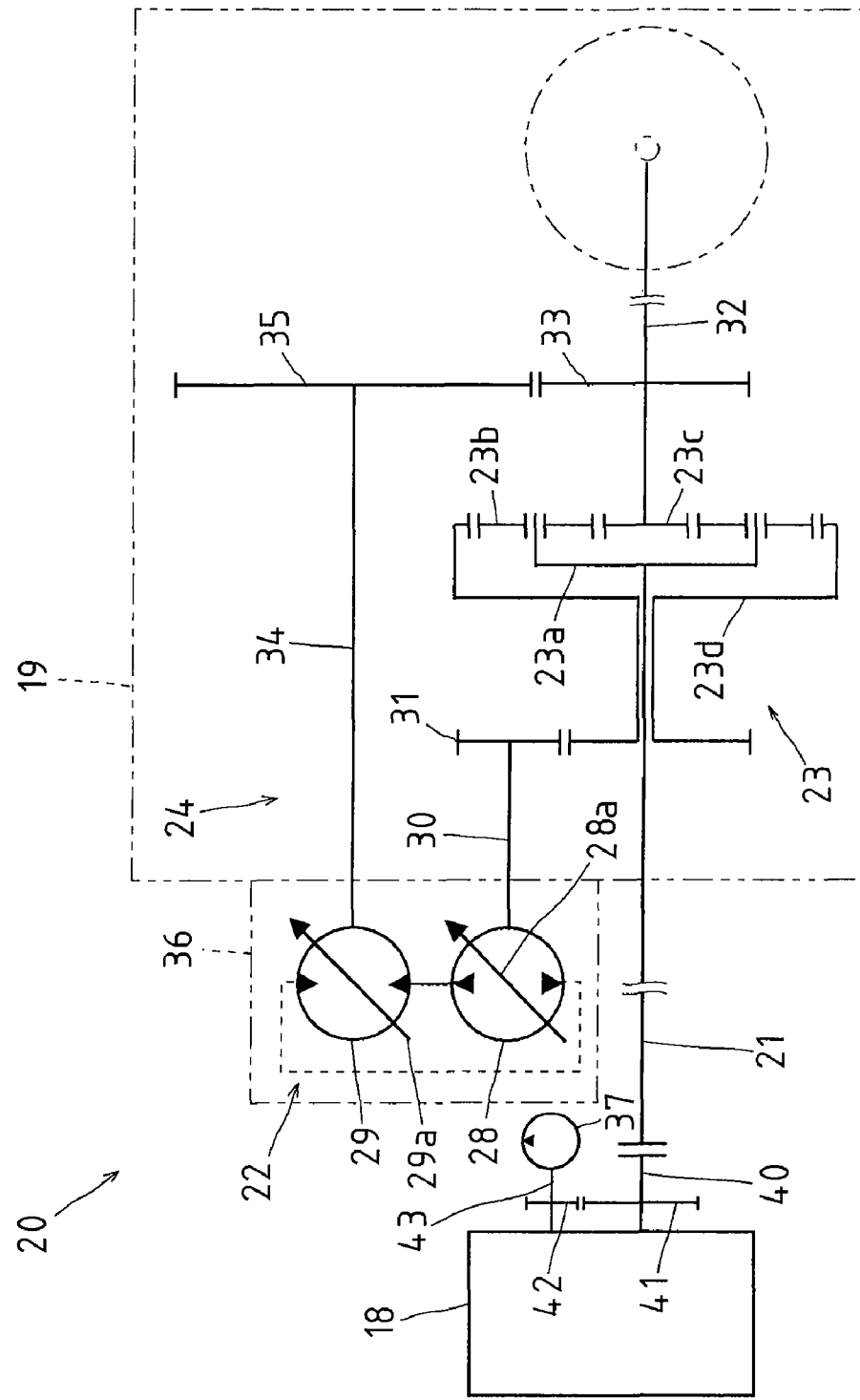
FIG. 5 is a skeleton view of an input split type HMT as an example of an HMT in accordance with the working vehicle.

Next, a description will be in detail given below of the transmission 20. As shown in FIGS. 3 to 5, the transmission 20 in the present embodiment is structured as an HMT type transmission. In other words, the transmission 20 is structured such as to be provided with an HMT 24 including an HST serving as a main transmission mechanism and a planetary gear mechanism 23 serving as a differential mechanism, and to be additionally provided with a clutch mechanism (not shown), a front wheel transmission shaft 27 transmitting a rear wheel power to the front axle case 25, a PTO transmission mechanism (not shown) shifting a working power and the like. Further, these elements are inwardly provided in the transmission case 19 except the HST 22 as mentioned below.

The HMT 24 is structured such as to continuously shift an input power by combining the HST 22 and the planetary gear mechanism 23. The HST 22 is provided with a variable displacement type hydraulic pump 28 changing a discharge amount by tilting swash plate angles of a movable swash plate 28a and a movable swash plate 29a, and a variable displacement type hydraulic motor 29, and these elements are hydraulically connected so as to continuously shift the power input to the hydraulic pump 28 and output from the hydraulic motor 29. These movable swash plates 28a and 29a are tilted by an automatic control mechanism constituted by a link mechanism and a solenoid which are not illustrated. In this case, in the present embodiment, the hydraulic pump 28 and the hydraulic motor 29 are set as the variable displacement type, however, the structure is not limited to this, but any one of them may be set to a fixed displacement type.

The planetary gear mechanism 23 is constituted by a carrier 23a, a planetary gear 23b, a sun gear 23c, a ring gear 23d and the like. As an operation mechanism constituting the HMT 24, the planetary gear mechanism 23 is generally employed, however, the structure is not limited to this.

In this case, the HMT 24 generally includes two types comprising an input split type dividing the input power from the engine 18 in the input side of the HST 22, and an output split type dividing the input power from the engine 18 in the output side of the HST 22, and each of the types is classified into six types in accordance with a coupling pattern of the input shaft (the transmission shaft 21) and the HST 22 with respect to each of the constituting elements (the carrier 23a, the sun gear 23c and the ring gear 23d) of the planetary gear mechanism 23. These types correspond to a known art, and a detailed description will be omitted. Further, the input split type is said to be efficient at a time when the working vehicle 1 is at a high speed, and the output split type is said to be efficient at a middle point. In the working vehicle 1 in the present embodiment, it is possible to have an optional structure including the HST type.

FIG. 5 shows a structure of the input split type HMT as one example of the HMT 24. In the structure of the HMT 24, the carrier 23a is rotatably supported concentrically on the transmission shaft 21 serving as the output shaft of the engine 18, and supports a plurality of planetary gears 23b. The planetary gears 23b are interposed between the sun gear 23c and the ring gear 23d so as to be engaged. The ring gear 23d is engaged with a gear 31 fitted onto the input shaft 30 of the hydraulic pump 28. Further, the gear 33 provided coaxially on the shaft 32 fixedly provided with the sun gear 23c is engaged with a gear 35 provided in the output shaft 34 of the hydraulic motor 29.

In accordance with the structure mentioned above, in the HMT 24, the power of the engine 18 is first transmitted temporarily to the planetary gear mechanism 23 via the transmission shaft 21. In the planetary gear mechanism 23, the power is transmitted to the sun gear 23c from the carrier 23a via the planetary gear 23b, and is divided and transmitted to the gear 33 from the planetary gear 23b via the ring gear 23d. Further, the rotational power output from the hydraulic motor 29 of the HST 22 is transmitted to the gear 33 engaging with the gear 35, and is combined with the rotational power transmitted to the sun gear 23c in the shaft 32 so as to be output.

Next, a description will be given in detail of a layout structure of the HST 22 in the transmission 20. The transmission 20 is conventionally structured such that the HST 22, the planetary gear mechanism 23 and the other mechanisms are inwardly provided within the transmission case 19, however, it is hard to execute the maintenance of the HST 22, and simplify the layout of the transmission 20 or the like. Particularly, since the HMT 24 is constituted by the HST 22 and the differential mechanism (the planetary gear mechanism 23), it is preferable that the structure is made such as to prevent the dust generated at a time of the output rotation of the differential mechanism (the planetary gear mechanism 23) and at a time of assembling these elements from being mixed into the HST 22. Accordingly, in the present embodiment, particularly in the HST 22 in the members constituting the transmission 20, the hydraulic pump 28 and the hydraulic motor 29 are integrally formed so as to be inwardly provided in the HST housing 36, and the HST 22 is provided in the front wall of the transmission case 19.

As shown in FIGS. 3 and 4, in the working vehicle 1 in the present embodiment, the HST 22 (the HST housing 36) is provided as an independent body from the other members constituting the transmission 20 in a front wall upper portion of a front end portion of the transmission case 19. The hydraulic pump 28 and the hydraulic motor 29 constituting the HST 22 are additionally provided in a tabular center section (not shown), and is integrally accommodated within the HST housing 36, and an inner side of the HST housing 36 and an inner side of the transmission case 19 are separated via the front wall of the transmission case 19. Further, the input shaft 30 of the hydraulic pump 28 and the output shaft 34 of the hydraulic motor 29 are inserted to the HST housing 36 through the front wall of the transmission case 19, and the structure is made such that the rotational power of the HST 22 transmitted from the output shaft 34 is combined with the rotational power of the planetary gear mechanism 23 within the transmission case 19.

Further, the transmission shaft 21 is coupled to the output shaft of the engine 18 via a main clutch or a damper inwardly provided in the clutch housing 49, and is structured such as to be directly inserted into the transmission case 19 from the engine 18 without passing through the HST housing additionally provided in the transmission case 19, that is, while passing through the lower side of the HST housing 36. Particularly, the HST 22 is arranged in such a manner as to be positioned in an upper side of the transmission shaft 21 of the engine 18 and the front wheel transmission shaft 27 in a laterally center position in a plan view. In the hydraulic pump 28 constituting the HST 22, the structure is made such that the transmission shaft 21 from the engine 18 and the input shaft 30 of the hydraulic pump 28 are approximately in parallel vertically (refer to FIG. 3), and the structure is made such that the input shaft 30 is positioned above the transmission shaft 21. Further, in the lower side of the transmission shaft 21, the front wheel output shaft 44 coupled in an interlocking manner to the shaft 32 is protruded to the front side of the transmission case 19, the power is transmitted to the front wheel transmission shaft 27 from the front wheel output shaft 44 via a universal joint 45, and the front wheel output shaft 44 is extended to the front axle case 25 from the transmission case 19. In accordance with the structure mentioned above, it is possible to easily execute a repair, a parts replacement, an inspection and the like by attaching and detaching the HST housing 36 or the lid body from the working vehicle at a time of executing the maintenance of the HST 22, without being obstructed by the transmission shaft 21 and the front wheel transmission shaft 27.

As mentioned above, since the hydraulic pump 28 and the hydraulic motor 29 are integrally formed so as to be provided in the front wall of the transmission case 19, and the structure is made such as to combine the rotational powers of the HST 22 and the planetary gear mechanism 23 within the transmission case 19, in the traveling drive system of the working vehicle 1, it is possible to prevent the dust (contamination) or the like from being mixed to the HST 22. In other words, since the transmission case 19 and the HST housing 36 are separately structured, the working fluid supplied to and discharged from the transmission case 19 and the HST housing 36 is separated, it is possible to prevent the dust generated by the gears such as the planetary gear mechanism 23 and the like constituting the transmission 20 from being mixed to the cylinder, the piston or the like of the hydraulic pump 28 and the hydraulic motor 29, in the HST 22, and it is possible to prevent a malfunction of the HST 22 by extension. Since it is possible to work while independently separating the HST 22 at a time of assembling and disassembling the transmission 20, it is possible to effectively prevent the foreign material such as the dust or the like from being mixed into the HST housing 36. Further, since the HMT 24 can be attached and detached while separating the HST 22 from the transmission case 19, a maintenance performance is improved, it is possible to arrange the HST 22 and the planetary gear mechanism 23 in the vicinity, and it is possible to simplify the structure of the transmission while improving the maintenance performance of the HMT 24.

Turning back to FIGS. 3 and 4, in the engine 18, there is arranged a working machine pump 37 for supplying and discharging the working fluid to and from the HST 22 of the working vehicle 1, the hydraulic actuator for moving up and down the loader 5 and the excavation apparatus 6. The working machine pump 37 is structured such as to be drivable from the output shaft 40 of the engine 18 via a gear, a belt or the like. Specifically, the working machine pump 37 is additionally provided in a gear case 50 provided in a rear side wall of the engine 18, is transmitted to a drive shaft 43 of the working machine pump 37 from output gears 41 and 42 fixedly provided in the output shaft 40, and is structured such as to be actuated by the driving force from the engine 18. The working vehicle 1 is structured simple so as to efficiently transmit the power of the engine 18, by additionally setting the working machine pump 37 in the engine 18 as mentioned above.

Further, in the present embodiment, the HST 22 is provided at a position longitudinally facing the working machine pump 37. In other words, the working vehicle 1 is structured such that the transmission case 19 is arranged in a rear side of the engine 18, the HST 22 is additionally provided in the front side wall of the transmission case 19, and the working machine pump 37 is additionally provided in the rear side wall of the engine 18. Further, a working fluid tank 38 and a fuel tank 39 are arranged in left and right sides of the transmission shaft 21 of the engine 18 in a space in which the HST 22 and the working machine pump 37 face each other, approximately in a lower side of the floor plate 14 between the transmission case 19 and the engine 18. Further, the HST 22 and the working machine pump 37 are connected by a supply and discharge oil pipe, and a filter or the like connected to the supply and discharged pipe is arranged in this space.

As mentioned above, it is possible to arrange the HST 22 and the working machine pump 37 in the vicinity by arranging the HST 22 and the working machine pump 37 approximately in the lower side of the floor plate 14 in a facing manner, it is possible to improve a maintenance performance of the HST 22 and the working machine pump 37, and it is possible to simplify the structure of the working vehicle 1. Particularly, in the working vehicle 1, since in the approximately lower space of the floor plate 14, there are concentrically arranged not only the HST 22 and the working machine pump 37, but also the hydraulic device such as the working fluid tank 38, the filter and the like, it is possible to make the hydraulic piping short, it is easy to arrange the hydraulic piping and it is possible to reduce a loss. Further, it is possible to easily execute the maintenance all at once by detaching the floor plate 14.

Particularly, as mentioned above, since the HST 22 is attached in such a manner as to be positioned above the transmission shaft 21 and the front wheel transmission shaft 27, it is easy to attach and detach the HST 22 from the working vehicle 1 without being obstructed by the transmission shaft 21, by detaching the floor plate 14, and it is possible to intend to simplify the maintenance and the structure of the working vehicle 1.

The present invention can prevent the dust from being mixed to the continuously variable transmission apparatus, can easily attach and detach the continuously variable transmission apparatus, can widely prevent the malfunction in the working vehicle and can be used for improving the cost and the maintenance performance, in the working vehicle.

The invention claimed is:

1. A working vehicle comprising:
   a continuously variable transmission apparatus, serving as a traveling drive system of the working vehicle, structured such as to combine a hydraulic continuous variable transmission apparatus and a gear mechanism so as to output a rotational power from an engine while changing speeds, wherein said continuously variable transmission apparatus comprises:
   a transmission case incorporating said gear mechanism;
   a hydraulic pump and a hydraulic motor driven by said hydraulic pump, serving as said hydraulic continuous variable transmission apparatus; and
   a hydrostatic transmission housing, having said hydraulic pump and said hydraulic motor housed therein, provided on a wall of said transmission case facing said engine; and
   a transmission shaft extending below said hydrostatic transmission housing and entering said transmission case to transmit power to said gear mechanism in said transmission case from the engine,
   wherein said gear mechanism includes an output portion, transmits a part of said rotational power of said transmission shaft to said hydraulic pump, and transmits a remaining part of said rotational power of said transmission shaft to said output portion, and
   wherein said hydraulic motor outputs an additional rotational power to said output portion of said gear mechanism driven by said remaining part of said rotational power of said transmission shaft.

2. A working vehicle according to claim 1, wherein said continuously variable transmission apparatus is provided at a position facing a working machine pump attached to a rear wall of said engine.

3. A working vehicle according to claim 1, wherein said continuously variable transmission apparatus, a working machine pump and a working fluid tank are arranged in a space below a floor plate.

4. A working vehicle according to claim 1, wherein a hydraulic operation device is arranged in an upper side of said continuously variable transmission apparatus.

5. A working vehicle according to claim 2, wherein said continuously variable transmission apparatus, the working machine pump and a working fluid tank are arranged in a space below a floor plate.

6. A working vehicle according to claim 2, wherein a hydraulic operation device is arranged in an upper side of said continuously variable transmission apparatus.

7. A working vehicle according to claim 3, wherein a hydraulic operation device is arranged in an upper side of said continuously variable transmission apparatus.

8. A working vehicle according to claim 5, wherein a hydraulic operation device is arranged in an upper side of said continuously variable transmission apparatus.

9. A working vehicle according to claim 1, wherein:
said hydraulic pump comprises an input shaft for receiving said part of said rotational power of said transmission shaft from said gear mechanism;
said hydraulic motor comprises an output shaft for outputting said additional rotational power to said output portion of said gear mechanism; and
said input shaft and said output shaft enter said transmission case through said front wall.

10. A working vehicle according to claim 1, further comprising:
a clutch housing receiving the rotational power from said engine, wherein said transmission shaft extends from said clutch housing.

* * * * *